(12) United States Patent
Algard et al.

(10) Patent No.: US 10,135,973 B2
(45) Date of Patent: Nov. 20, 2018

(54) USING CNAM INJECTION TO DELIVER CALLER INFORMATION

(71) Applicant: Hiya, Inc., Seattle, WA (US)

(72) Inventors: Alexander Klas Algard, London (GB); Mayur Arun Kamat, Redmond, WA (US); Petr Jann, Redmond, WA (US)

(73) Assignee: HIYA, INC., Seattle, WA (US)

( * ) Notice: Subject to any disclaimer, the term of this patent is extended or adjusted under 35 U.S.C. 154(b) by 0 days.

(21) Appl. No.: 15/847,713

(22) Filed: Dec. 19, 2017

(65) Prior Publication Data

US 2018/0176368 A1 Jun. 21, 2018

Related U.S. Application Data

(60) Provisional application No. 62/437,018, filed on Dec. 20, 2016.

(51) Int. Cl.
*H04M 1/64* (2006.01)
*H04M 3/42* (2006.01)

(52) U.S. Cl.
CPC ... *H04M 3/42042* (2013.01); *H04M 3/42059* (2013.01); *H04M 2203/551* (2013.01); *H04M 2203/558* (2013.01)

(58) Field of Classification Search
CPC ........ H04M 3/42042; H04M 3/42059; H04M 2203/551; H04M 2203/558
USPC .......... 379/67.1–88.28, 142.01–142.18, 201; 370/351–357; 704/270–278; 709/201–207, 217–248
See application file for complete search history.

(56) References Cited

U.S. PATENT DOCUMENTS

| 5,341,414 | A | 8/1994 | Popke | |
|---|---|---|---|---|
| 6,324,271 | B1 | 11/2001 | Sawyer et al. | |
| 8,626,137 | B1 * | 1/2014 | Devitt | H04M 3/42042 455/414.3 |
| 9,060,057 | B1 * | 6/2015 | Danis | H04M 3/42059 |
| 9,241,013 | B2 | 1/2016 | Chow et al. | |
| 9,325,839 | B2 | 4/2016 | Bender et al. | |
| 9,774,731 | B1 * | 9/2017 | Haltom | H04M 3/4365 |

(Continued)

FOREIGN PATENT DOCUMENTS

WO WO 2016/048203 A1 3/2016

OTHER PUBLICATIONS

Brandom, R., "AT&T is Adding a Spam Filter for Phone Calls," The Verge, Dec. 20, 2016, 3 pages, [Online] [Retrieved on Jan. 3, 2018] Retrieved from the Internet<URL:http://www.theverge.com/2016/12/20/14028948/att-call-protect-spam-filter-fraud-caller>.

(Continued)

*Primary Examiner* — Hemant Patel
(74) *Attorney, Agent, or Firm* — Fenwick & West LLP

(57) ABSTRACT

A carrier platform sends a query requesting CNAM information associated with a call to a CNAM database. A caller reputation server intercepts the query from the carrier platform to the CNAM database. The caller reputation server determines reputation information for the call. The reputation information indicates the likelihood that the call is a nuisance call. The caller reputation server further generates a reputation message describing the reputation information and sends the reputation message to the carrier platform in response to the query. As a result, the carrier platform sends the reputation message to a called device.

20 Claims, 6 Drawing Sheets

(56) References Cited

U.S. PATENT DOCUMENTS

| | | |
|---|---|---|
| 9,894,199 B1 | 2/2018 | Wiechman et al. |
| 2003/0095639 A1* | 5/2003 | Vinson ................ H04Q 3/0029 379/37 |
| 2005/0201363 A1 | 9/2005 | Gilchrist et al. |
| 2006/0233160 A1 | 10/2006 | Kawanishi et al. |
| 2006/0253584 A1 | 11/2006 | Dixon et al. |
| 2007/0201638 A1 | 8/2007 | Lalter et al. |
| 2007/0248220 A1 | 10/2007 | Crandell et al. |
| 2009/0254529 A1 | 10/2009 | Goldentouch |
| 2011/0280160 A1 | 11/2011 | Yang |
| 2015/0043724 A1 | 2/2015 | Farris |

OTHER PUBLICATIONS

PCT International Search Report and Written Opinion, PCT Application No. PCT/US17/67423, dated Mar. 8, 2018, 20 pages.
PCT International Search Report and Written Opinion, PCT Application No. PCT/US17/67429, dated Mar. 8, 2018, 23 pages.

\* cited by examiner

USING CNAM INJECTION TO DELIVER CALLER INFORMATION

CROSS-REFERENCE TO RELATED APPLICATIONS

This application claims the benefit of U.S. Provisional Patent Application No. 62/437,018, filed Dec. 20, 2016, the disclosure of which is hereby incorporated by reference in its entirety.

BACKGROUND

1. Field of Art

The present invention generally relates to the field of telephony and specifically to using CNAM to provide reputation information about callers.

2. Background of the Invention

Nuisance telephone calls are a growing problem. Such calls include unsolicited calls from nuisance callers like telemarketers and fraudsters. Computer technology, such as "robocallers," allows the nuisance callers to place a high volume of calls. Moreover, centralized directory services make it easier for the nuisance callers to gather large amounts of telephone numbers. The combination of these two abilities allows nuisance callers to engage in mass calling campaigns. These unwanted calls interrupt and annoy the called party.

Technology provides some solutions to the problems caused by nuisance telephone calls. One such technology is Caller ID Name (CNAM), which can provide a 15-character string to a called telephone. The string may identify, for example, the name of the calling party. However, the CNAM information is often insufficient to allow a called party to evaluate whether a call is a nuisance.

SUMMARY

The above and other issues are addressed by a method, computer system, and computer-readable storage medium for delivering reputation information. An embodiment of the method includes receiving a query from a carrier platform requesting CNAM information associated with a call from a caller number. The method further includes determining reputation information responsive to the caller number, the reputation information indicating a likelihood that the call is a nuisance call. The method further includes generating a reputation message describing the reputation information. The method also includes sending the reputation message to the carrier platform in response to the query requesting CNAM information.

An embodiment of the computer system includes a computer processor for executing computer program instructions. The system also includes a non-transitory computer-readable storage medium storing computer program instructions executable by the processor. The instructions are executable to receive a query from a carrier platform requesting CNAM information associated with a call from a caller number. The instructions are further executable to determine reputation information responsive to the caller number, the reputation information indicating a likelihood that the call is a nuisance call. The instructions additionally generate a reputation message describing the reputation information and send the reputation message to the carrier platform in response to the query requesting CNAM information.

An embodiment of the non-transitory computer-readable storage medium stores executable computer program instructions. The instructions are executable to receive a query from a carrier platform requesting CNAM information associated with a call from a caller number. The instructions are further executable to determine reputation information responsive to the caller number, the reputation information indicating a likelihood that the call is a nuisance call. The instructions additionally generate a reputation message describing the reputation information and send the reputation message to the carrier platform in response to the query requesting CNAM information.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
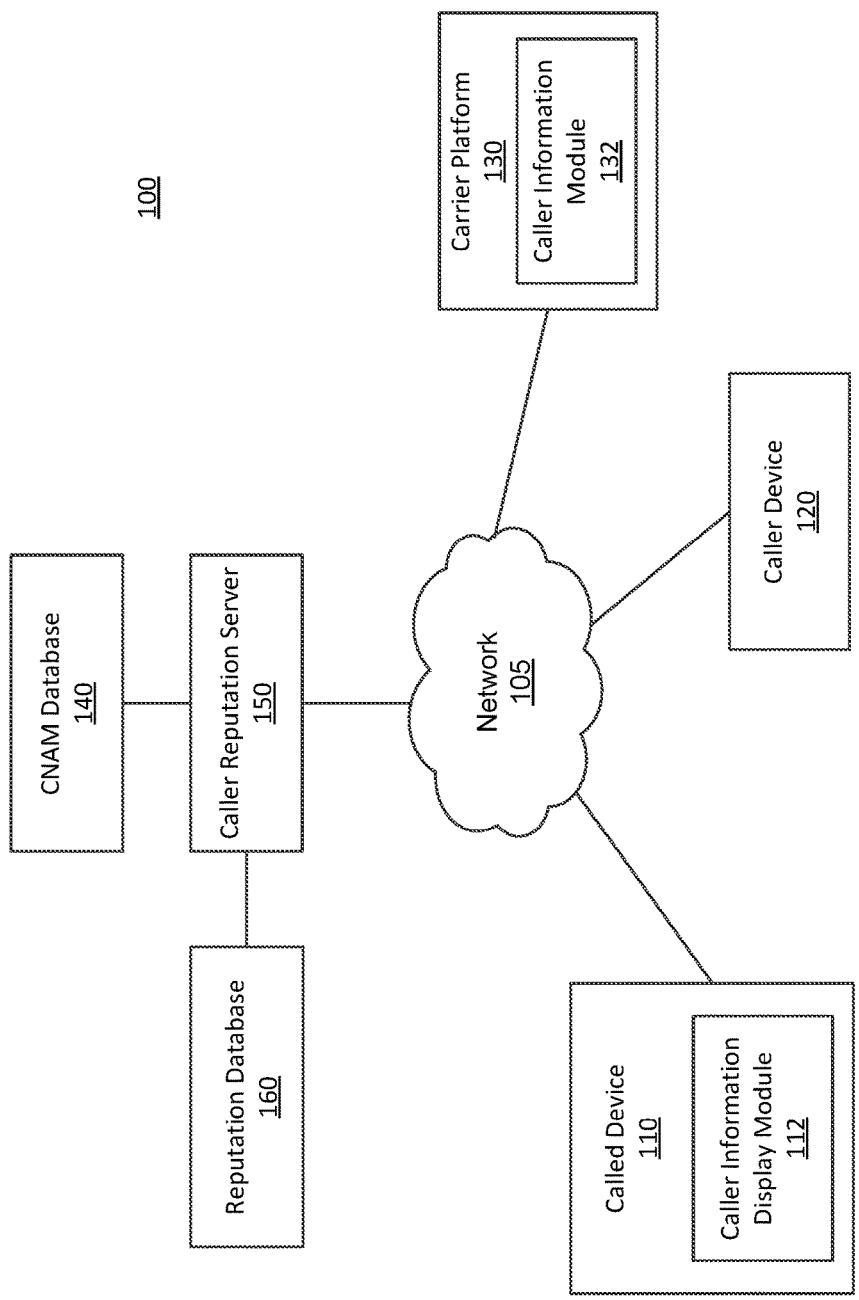
FIG. 1 is a high-level block diagram illustrating a computing environment for using CNAM injection to deliver caller information according to one embodiment.

FIG. 1 is a high-level block diagram illustrating a computing environment 100 for using CNAM injection to deliver caller information according to one embodiment. As shown, the computing environment 100 includes a called device 110, a caller device 120, a carrier platform 130, a CNAM database 140, and a caller reputation server 150, which are connected via a network 105. The caller reputation server 150 is connected to a reputation database 160. Only one of each of these entities is illustrated in FIG. 1 for clarity.

Embodiments of the environment 100 can have many called 110 and caller 120 devices, as well as multiple carrier platforms 130, CNAM databases 140, caller reputation servers 150 and reputation databases 160. Likewise, the entities can be arranged in a different manner than displayed in FIG. 1. For example, the caller reputation server 150, reputation database 160, and/or CNAM database 140 may be implemented within the carrier platform 130 in some embodiments.

The caller device 120 is a telephone or another electronic device with telephone-like functionality that allows a caller to place a call. For example, the caller device 120 can be an individual landline or mobile telephone used by a single person to place calls. The caller device can also be computer operating call platform software that allows multiple people to place calls simultaneously, such as software operated by a telemarketer. The caller device 120 from which a call is placed has an associated caller number. The caller number may be fixed, so that all calls from the caller device 120 have the same caller number. The caller number may be dynamic, so that different calls from the caller device 120 have different caller numbers. For example, calls from a telemarketer call center may originate from a same caller number associated with the telemarketer. Likewise, calls from a telemarketer call center may be assigned a dynamic caller number from a pool of numbers associated with the telemarketer, or even numbers not associated with the telemarketer. A call originating from the caller device 120 also has an associated called number. The called number identifies the party to whom the call is placed.

The carrier platform 130 routes the call placed by the caller device 120 to the called device 110 using the called number and via the network 105. As part of this routing, the carrier platform 130 may receive the call from a different carrier platform and/or route the call to a different carrier platform. In one embodiment, the carrier platform 130 is operated by a telephony provider and provides calling, data, and other telephony services to a large number caller 120 and called 110 devices. The carrier platform 130 may provide service to wired and/or wireless devices. The carrier platform 130 may include one or more computing devices communicatively coupled to each other in a network to perform the operations of the carrier platform 130.

The carrier platform 130 includes a caller information module 132 that provides caller information about the caller using the caller device 120 to the called device 110 in association with a call placed between the two devices. The caller information may include the caller number associated with the caller device 120, reputation information describing a reputation of the caller, and/or CNAM information about the caller. In one embodiment, the caller information module 132 accesses the CNAM database 140 to obtain at least some of the caller information. For example, the caller information module 132 may send a CNAM information query to the CNAM database 140 using the caller number as a key and obtain CNAM information from the database in response to the query.

The caller information module 132 provides the caller information to the called device 110 using the caller identification (caller ID) service. Generally, this service provides the caller information to the called device using analog and/or digital data transmission in-band with the signal carrying the call. The caller information module 132 uses the caller ID service to send CNAM information obtained from the CNAM database 140 to the called device 110 so that the caller information including the CNAM information arrives at the called device 110 contemporaneously with the call.

The CNAM database 140 associates CNAM information with caller numbers. The CNAM database 140 receives queries for caller information associated with particular caller numbers and provides the CNAM information in response. In one embodiment, the CNAM information for a given caller number is limited to a single 15-character string. The CNAM information describes an entity associated with the caller number. The CNAM information can include, for example, the name of a person, business, or other entity associated with the caller number. The CNAM information for particular caller numbers in the CNAM database 140 tends to be static. The CNAM information in the CNAM database 140 may be based on subscriber information from the carrier platform 130 and/or based on other sources. Likewise, the CNAM database 140 can be operated by the operator of the carrier platform 130 or by a third party.

The caller reputation server 150 intercepts queries for caller information, such as CNAM information queries, sent from the caller information module 132 to the CNAM database 140. The caller reputation server 150 determines reputation information associated with the caller numbers in the requests. An embodiment of the caller reputation server 150 queries the reputation database 160 using the caller numbers and receives reputation information in response. The reputation information indicates the likelihoods that that the calls are nuisance calls. The caller reputation server 150 responds to queries from the caller information module 132 by providing the reputation information in place of, and/or in addition to, CNAM information from the CNAM database 140. This technique is referred to as "CNAM injection" because the caller reputation server 150 injects the reputation information into the response to the CNAM information request. As a result, the caller information module 132 sends the reputation information to called devices 110.

In one embodiment, the caller reputation server 150 passes the query from the caller information module 132 to the CNAM database 140 and receives CNAM information in response. The caller reputation server 150 then forms a response to the caller information module 132 including both reputation information and CNAM information. The caller reputation server 150 may be operated by the same entity that operates the carrier platform 130 and/or the CNAM database 140, or operated by a different entity. In addition, the caller reputation server 150 may be integrated into the CNAM database 140 and/or the caller information module 132.

The reputation database 160 stores reputation information in association with caller numbers. The reputation information may also be associated with other information, such as CNAM information. The reputation database 160 receives queries for reputation information associated with particular caller numbers and provides the reputation information in response. The reputation information may be generated by the caller reputation server 150 and stored in the reputation database 160 and/or received from other sources. At least some of the reputation information is dynamic and changes over time as reputations associated with caller numbers change.

The called device 110 is a telephone or other electronic device with telephone-like functionality that allows a called party to receive a call. Like the caller device 120, the called device 110 can be an individual landline or mobile telephone. The called device 110 can also be a computer executing software that allows the computer to receive calls. The called device has an associated called number. The called number may be fixed, so that all calls sent to the called number are received by the called device 110. The called number may be dynamic, so that the called number associated with the called device 110 changes over time. Although this description refers to the device as the "called device" 110, the device may also have functionality allowing it to place calls to other devices.

The called device 110 has an associated caller information display module 112 that supports the caller ID service used by the carrier platform 130. The caller information display module 112 may display and/or otherwise present the received caller information. The caller information display module 112 may also apply a policy to a received call based on received caller information.

Recall from above that the caller reputation server 150 injects reputation information into the response to the CNAM information request from the caller information module 132. The caller information module 132 includes the reputation information in the caller information sent to the called device 110 with the call. The caller information display module 112 accordingly displays the reputation information to the called party contemporaneously with receipt of the call. The called party can thus use the reputation information to screen or otherwise avoid nuisance calls. The caller information display module 112 may also apply a policy to the call based on the reputation information, such as automatically blocking calls having reputation information indicating a high likelihood that the calls are nuisance calls.

The caller information display module 112 may be incorporated into the called device 110. For example, the caller information display module 112 may be a dedicated display built into the handset or base unit of a landline phone. Likewise, the caller information display module 112 may include functionality incorporated into a mobile device that displays the caller information on a screen of the mobile device when it receives a call. The caller information display module 112 may alternatively be a separate display apart from the called device 110. For example, the caller information display module 112 may be a dedicated device for displaying caller information, a television, or a computer display configured to display information when an associated called device 110 receives a call. The caller information display module 112 need not actually display the information. It can present the information in other ways such as via audio and/or haptic cues.

The network 105 enables communication between the various entities illustrated in FIG. 1. In one embodiment, the network 105 uses standard communication technologies and/or protocols and can include the Internet as well as landline and mobile telephone networks. Thus, the network 102 can include links using technologies such as Ethernet, 802.11, worldwide interoperability for microwave access (WiMAX), 2G/3G/4G mobile communication protocols, and/or other protocols used on the public switched telephone network (PSTN).

Figure 2:
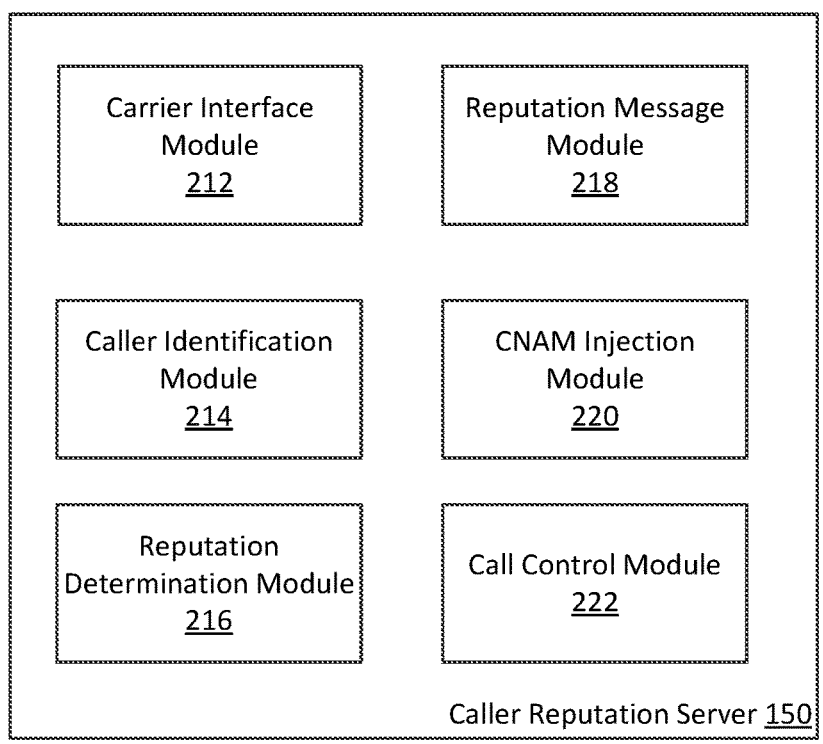
FIG. 2 is a high-level block diagram illustrating a detailed view of the caller reputation server according to one embodiment.

FIG. 2 is a high-level block diagram illustrating a detailed view of the caller reputation server 150 according to one embodiment. As shown in FIG. 2, the caller reputation server 150 includes multiple modules. In some embodiments, the functions are distributed among the modules in a different manner than described herein. Moreover, the functions are performed by other entities in some embodiments.

The carrier interface module 212 interacts with the carrier platform 130. To this end, the carrier interface module 212 intercepts and responds to queries for caller information sent from the carrier platform 130 to the CNAM database 140. In one embodiment, the carrier interface module 212 mimics the functionality of the CNAM database 140, so that the carrier platform 130 need not be modified to interact with the caller reputation server 150. The carrier interface module 212 thus intercepts queries for caller information sent by the carrier platform 130 to the CNAM database 140. The carrier interface module 212 forwards the intercepted queries to other modules within the caller reputation server 150. The carrier interface module 212 also receives information from the other modules within the caller reputation server 150, forms the information into responses to the intercepted queries, and sends the responses to the carrier platform 130. The carrier interface module 212 thus responds to queries for caller information with responses including reputation information.

The caller identification module 214 determines identity information for calls for which queries were received from the carrier platform 130. The caller identification module 214 receives an intercepted query from the carrier interface module 212 and parses the query to identify the caller number contained therein. The caller identification module 214 may also query the CNAM database 140 using the identified caller number and receive CNAM information in response. The caller identification module 214 sends the caller number and/or the CNAM information, individually and collectively referred to as "caller identity information," to the reputation determination module 216.

The reputation determination module 216 determines reputation information for caller identity information identified by the caller identification module 214. The reputation information indicates the likelihood that a call having given caller identity information is a nuisance call. In one embodiment, the reputation determination module 214 queries the reputation database 160 using the caller identity information received from the caller identification module 214 and receives the reputation information in response.

In one embodiment, the reputation determination module 216 also generates the reputation information and stores it in the reputation database 160. The reputation determination module 216 may generate the reputation information by analyzing one or more of a variety of reputation signals. In addition, the inputs used by the reputation determination module 216 to determine the reputation information may be received from a variety of sources including caller 120 and called 110 devices, carrier platforms 130, and third party databases.

The reputation determination module 216 may use call activity histories associated with the caller identity information as a signal of reputation. For example, the reputation determination module 216 may determine that a caller number is used to place calls to more than a threshold number of different called devices 110 within a specified time period. Such activity is a signal that the caller number is being used to place nuisance calls, as it is unlikely that a legitimate (i.e., non-nuisance) caller would use the caller number in this way. The reputation determination module 216 may use reports from called devices 110 as a signal of reputation. These reports may be explicit or implicit. For example, users of the called devices 110 may explicitly report nuisance calls received on the devices, and the reputation determination module 216 may use these reports to identify caller identity information used to make the nuisance calls. In another example, the called devices 110 may report how the users responded to calls having particular caller identity information (e.g., answered call, forwarded call to voicemail, answered and hung up within a given time interval). These reports are implicit signals of whether the calls are nuisance calls because users tend to ignore and/or hang up on nuisance calls. The reputation determination module 216 may also use information from the CNAM database 140 as a signal of reputation. For example, the CNAM information for a called number may indicate that the number is associated with an entity known to place nuisance calls, such as a telemarketing company.

The reputation message module 218 generates reputation messages describing the reputation information associated with caller identity information. The reputation message module 218 receives the reputation information for caller identity information from the reputation determination module 216 or by querying the reputation database 160. The reputation message module 218 transforms the reputation information into a specific representation that quantitatively and/or qualitatively describes the reputation information. One embodiment of the reputation message module 218 combines multiple signals, including the signals described above, to produce the specific representation. The reputation message module 218 may use different weights for different signals.

For example, the reputation message module 218 may represent the reputation information as a quantitative reputation score describing the likelihood that the call is a nuisance call. The reputation score may be a value between 0 and 10, with 0 indicating that the call is least likely to be a nuisance call and 10 indicating that the call is most likely to be a nuisance call. The reputation information may also be represented as a continuous value between a specified range, such as a value between 0 and 1, with 0 indicating that the call is least likely to be a nuisance call and 1 indicating that the call is most likely to be a nuisance call.

The reputation message module 218 may also represent the reputation information as a qualitative reputation label describing the likelihood that the call is a nuisance call. The reputation message module 218 may associate text labels with the reputation information and/or the quantitative reputation scores. For example, a reputation score of 0 can have an associated label of "not nuisance," a score of 5 can have an associated label of "may be nuisance," and a score of 10 can have an associated label of "nuisance." The text labels may describe the type of caller. For example, the reputation information may include text labels such as "trusted caller," "telemarketer," "pollster," or "robocaller."

In one embodiment, the reputation message module 218 represents the reputation information as a reputation message having one or more of a set of discrete codes. The 15 character alphanumeric strings supported by CNAM allows for a large number of different of values. The reputation message module 218 can generate a reputation message that uses all or a subset of these characters as a code describing the reputation information for given caller identity information. In one embodiment, the reputation message module 218 includes a dictionary relating codes to textual messages. The textual messages convey the likelihood that a call is a nuisance call and/or convey other information about the call. The messages may correspond to the labels described above (e.g., "trusted caller," "telemarketer," "pollster") and/or to other labels describing the caller. The reputation message module 218 determines a label from the dictionary, where the label describes the likelihood that the call is a nuisance call, and forms a reputation message containing the code corresponding to this label from the dictionary.

The reputation message module 218 may use a subset of the available 15 characters to represent the reputation information while leaving the other characters available to contain CNAM information. One or more characters in the subset can indicate that the reputation message includes a code while other characters in the subset can represent the code itself. Using discrete codes in this manner allows more information to be conveyed within the 15 character limit.

The CNAM injection module 220 injects reputation messages from the reputation message module 218 into the CNAM information for a call. Since the reputation messages describe reputation information, the CNAM injection module 220 effectively injects the reputation information. In one embodiment, the CNAM injection module 220 injects a reputation message by sending a reputation message associated with a particular caller number to the carrier interface module 212. The carrier interface module 212 then sends the reputation message to the carrier platform 130 as a response to a query for caller information. In other embodiments, the CNAM injection module 220 may inject the reputation message in other ways, such as by storing the reputation message in the CNAM database 140, so that the CNAM database 140 responds to a query for caller information with the reputation message.

The call control module 222 interacts with the carrier platform 130 to provide call control functionality. The call control functionality may include delaying or blocking calls from caller devices 120 from reaching called devices 110. The call control module 222 may interact with the carrier platform 130 to delay a call from a caller device 120 to a called device 110. This delay can be used to determine the reputation information for given caller identity information and inject the reputation message into the CNAM information for the call. The call control module 22 may also interact with the carrier platform 130 to block a call from a caller device 120 to a called device 110 in response to the reputation information, such as by blocking calls having reputation information indicating a threshold likelihood that the calls are nuisances.

Figure 3:
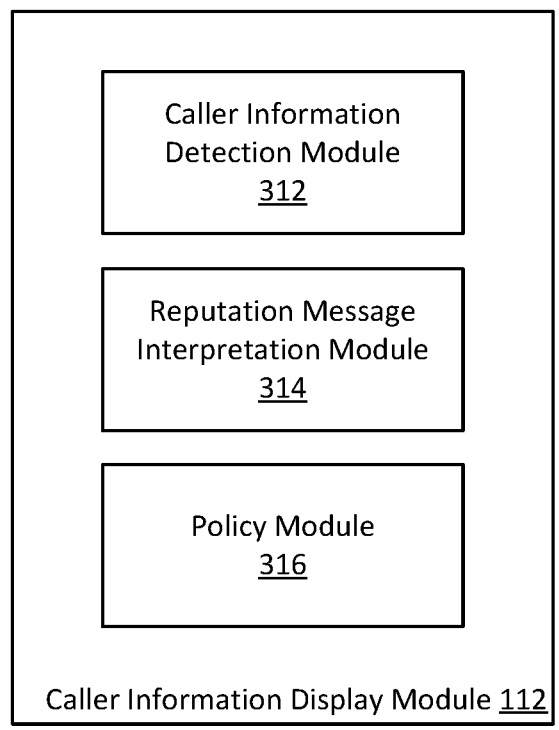
FIG. 3 is a high-level block diagram illustrating a detailed view of the caller information display module on the called device according to one embodiment.

FIG. 3 is a high-level block diagram illustrating a detailed view of the caller information display module 112 on the called device 110 according to one embodiment. As shown in FIG. 3, the caller information display module 112 includes multiple modules. In some embodiments, the functions are distributed among the modules in a different manner than described herein. Moreover, the functions are performed by other entities in some embodiments.

The caller information detection module 312 detects and displays, or otherwise presents, the caller information sent by the carrier platform 130 in association with calls. As discussed above, the caller information for a call may include the caller number, a reputation message, and/or CNAM information sent using the caller ID service. The caller information detection module 312 displays the caller information on or in association with the called device 110 contemporaneously with receipt of the call. The caller information detection module 312 may display the reputation message in the same manner that it displays the caller number and/or CNAM information. The caller information detection module 312 may display only some of the caller information, such as only the reputation message. For example, the caller information detection module 312 may display a message such as "trusted caller" or "telemarketer."

The caller information detection module 312 detects reputation messages that include discrete codes. Specifically, the caller information detection module 312 detects the characters in the reputation message indicating that the reputation message includes a code and extracts the code. The caller information detection module 312 passes the code to the reputation message interpretation module 314 and receives a decoded message in response. The caller information detection module 312 then displays the decoded message as the reputation message.

The reputation message interpretation module 314 interprets codes received from the caller information detection module 312 and sends corresponding decoded messages in response. In one embodiment, the reputation message interpretation module 314 includes a dictionary that relates codes to textual messages. The dictionary is a counterpart to the dictionary included in the reputation message module 218. The reputation message interpretation module 314 looks up the code in the dictionary to identify the associated textual message, and returns this message as the decoded message. The reputation message interpretation module 314 may receive the dictionary from the caller reputation server 150 or carrier platform 130 via the network 105, or from another source.

The policy module 316 applies policies to calls based on the reputation messages. A policy specifies one or more actions to perform in connection with a call. The policy module 316 receives the reputation message for a call from the caller information detection module 312, determines whether a policy exists for the reputation message, and, if a policy exists, performs the one or more actions specified by the policy to the call. The actions change how the called device 110 handles the call. For example, a policy can select and play one of several available ringtones to announce the call based on the reputation message. In another example, a policy can block, answer then immediately hang up, or forward a call based on the reputation message.

Figure 4:
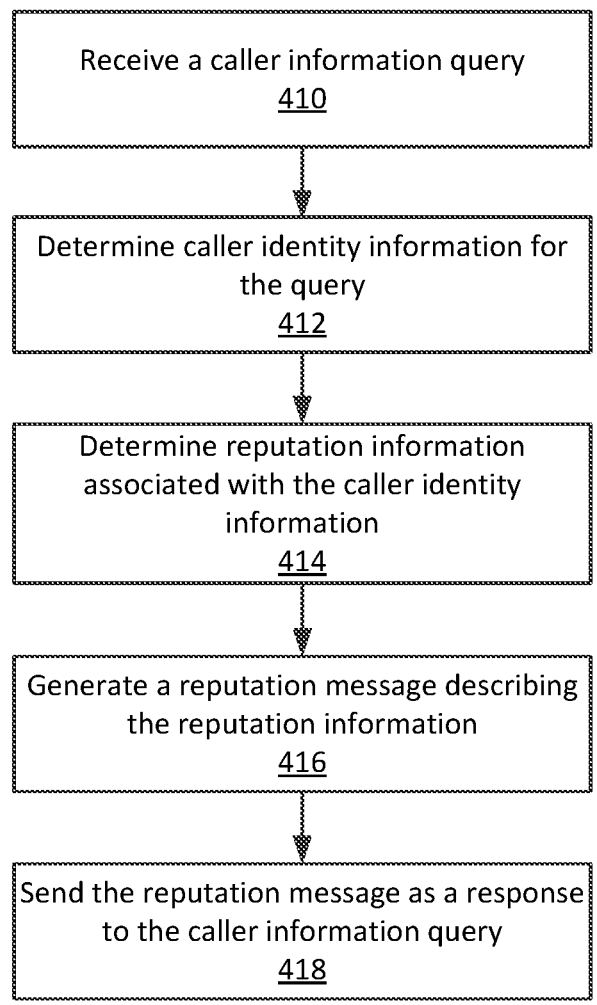
FIG. 4 is a flow chart illustrating a method for using CNAM injection to deliver caller information according to one embodiment.

FIG. 4 is a flow chart illustrating a method for using CNAM injection to deliver caller information according to one embodiment. In some embodiments, the method is performed by the caller reputation server 150, although some or all of the operations in the method may be performed by other entities in other embodiments. In some embodiments, the operations in the flow chart are performed in a different order and can include different and/or additional steps.

The caller reputation server 150 receives 410 a caller information query from the carrier platform 130. For example, the caller reputation server 150 may intercept a CNAM information query sent from the carrier platform 130 to the CNAM database 140. The caller reputation server 150 determines 412 caller identity information for the query. The caller identity information may include the caller number and/or the CNAM information associated with the caller number. The caller reputation server 150 determines 414 reputation information associated with the caller identity information. For example, the reputation information may be based on the caller number. The caller reputation server 150 may determine 414 the reputation by querying the reputation database 160 and/or by analyzing one or more reputation signals. The reputation information indicates the likelihood that a call having given caller identity information is a nuisance call. The caller reputation server 150 generates 416 a reputation message describing the reputation information. The caller reputation server 150 sends 418 the reputation message to the carrier platform 130 as a response to the caller information query, thereby injecting the reputation message into the CNAM information. The carrier platform 130 may then send the reputation message to the called device 110 using the caller ID service.

Figure 5:
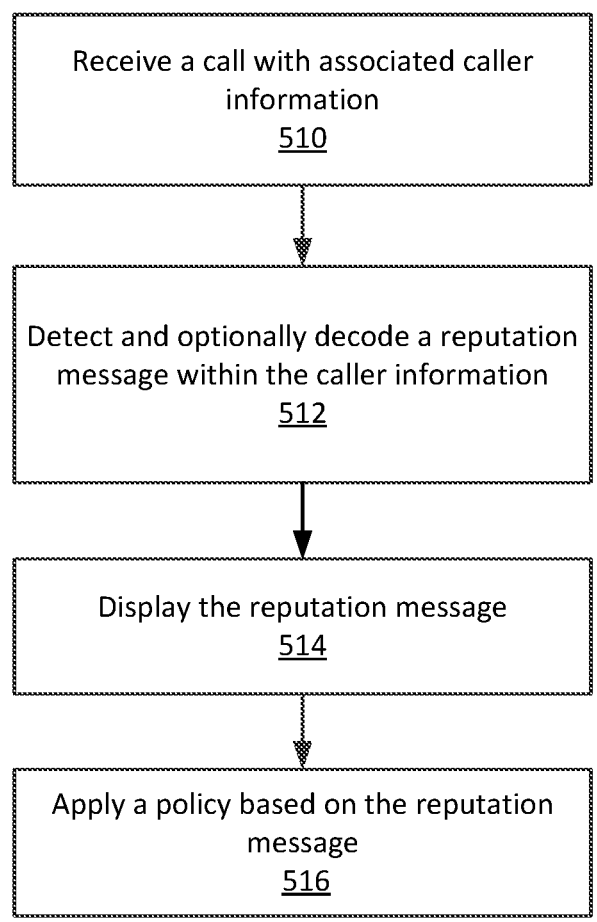
FIG. 5 is a flowchart illustrating a method for receiving caller information delivered by using CNAM injection according to one embodiment.

FIG. 5 is a flow chart illustrating a method for receiving caller information delivered by using CNAM injection according to one embodiment. In some embodiments, the method is performed by a called device 110, although some or all of the operations in the method may be performed by other entities in other embodiments. In some embodiments, the operations in the flow chart are performed in a different order and can include different and/or additional steps.

The called device 110 receives 510 a call from the carrier platform 130. Contemporaneously with receipt of the call, the called device 110 receives 510 caller information via the caller ID service of the carrier platform 130. The caller information includes a reputation message injected into the caller information. The called device 110 detects 512 the reputation message within the caller information. The reputation message may include a discrete code. If the reputation message includes a code, the called device 110 decodes it 512. The called device 110 displays or otherwise presents 514 the reputation message, which may be the message included within the caller information or the decoded message. The called device 110 may also apply 516 a policy to the call based on the reputation message. For example, the called device 110 may answer then immediately hang up on a call having a reputation message indicating it is a nuisance call.

Figure 6:
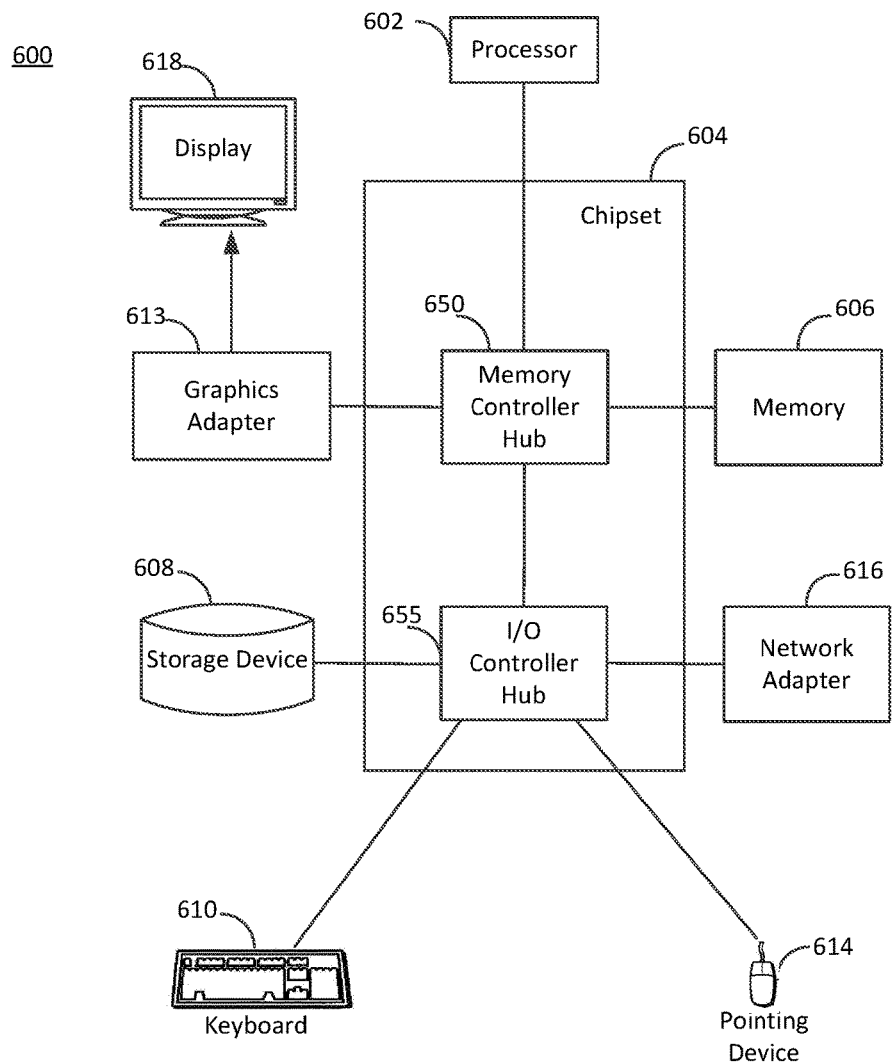
FIG. 6 is a high-level block diagram illustrating an example of a computer for acting as one or more of the entities shown in FIG. 1.

FIG. 6 is a high-level block diagram illustrating an example of a computer 600 for acting as one or more the entities shown in FIG. 1. Illustrated are at least one processor 602 coupled to a chipset 604. The chipset 604 includes a memory controller hub 650 and an input/output (I/O) controller hub 655. A memory 606 and a graphics adapter 613 are coupled to the memory controller hub 650 and a display device 618 is coupled to the graphics adapter 613. A storage device 608, keyboard 610, pointing device 614 and network adapter 616 may be coupled to the I/O controller hub 655. Other embodiments of the computer 600 have different architectures. For example, the memory 606 is directly coupled to the processor 602 in some embodiments. As another example, some embodiments of the computer 600 may have different I/O devices, such as a touchscreen, camera, gyroscope, etc.

The storage device 608 is a non-transitory computer-readable storage medium such as a hard drive, compact disk read-only memory (CD-ROM), DVD or a solid-state memory device. The memory 606 holds instructions and data used by the processor 602. The pointing device 614 is used in combination with the keyboard 610 to input data into the computer system 600. The graphics adapter 613 displays images and other information on the display device 618. In some embodiments, the display device 618 includes a touch screen capability for receiving user input and selections. The network adapter 616 couples the computer system 600 to the network 105. Some embodiments of the computer 600 have different and/or other components than those shown in FIG. 6. For example, the carrier platform 130 and/or the caller reputation server 150 can be formed of multiple blade servers and lack a display device, keyboard, and other components.

The computer 600 is adapted to execute computer program modules for providing functionality described herein. As used herein, the term "module" refers to computer program instructions and other logic used to provide the specified functionality. Thus, a module can be implemented in hardware, firmware and/or software. In one embodiment, program modules formed of executable computer program instructions are stored on the storage device 608, loaded into the memory 606 and executed by the processor 602.

Upon reading this disclosure, those of skill in the art will appreciate that additional alternative structural and functional designs are possible. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of delivering reputation information, comprising:
   receiving a query from a carrier platform requesting caller ID name (CNAM) information associated with a call from a caller number;
   responsive to receipt of the query, interfacing with the carrier platform to delay the call;
   determining reputation information responsive to the caller number, the reputation information indicating a likelihood that the call is a nuisance call;
   generating a reputation message describing the reputation information; and
   sending the reputation message to the carrier platform in response to the query requesting CNAM information.

2. The computer-implemented method of claim 1, wherein receiving a query from the carrier platform requesting CNAM information comprises:
   intercepting a query sent from the carrier platform to a CNAM database requesting CNAM information for a call placed by a calling device having the caller number;
   wherein the carrier platform sends the reputation message to a called device using a caller identification (ID) service and the called device displays the reputation message.

3. The computer-implemented method of claim 1, wherein determining reputation information comprises:
   sending the query requesting CNAM information to a CNAM database and receiving CNAM information in response thereto, the CNAM information and the caller number comprising caller identity information; and
   querying a reputation database using the caller identity information, the reputation database storing reputation information in association with caller identity information, and receiving the reputation information in response thereto.

4. The computer-implemented method of claim 1, wherein determining reputation information comprises:
   generating the reputation information responsive at least in part to a call activity history associated with the caller number.

5. The computer-implemented method of claim 1, wherein generating a reputation message comprises:
   representing the reputation information as a quantitative reputation score having a value indicating a likelihood that the call is a nuisance call;
   associating a text label with the quantitative reputation score; and
   generating the reputation message responsive to the text label.

6. The computer-implemented method of claim 1, wherein generating a reputation message comprises:
   determining a text label describing the reputation information;
   identifying a code value corresponding to the text label in a dictionary; and
   forming a reputation message containing the code value;
   wherein the carrier platform sends the reputation message to a called device using a caller identification (ID) service, the called device detects and interprets the code value contained in the reputation message to identify the text label describing the reputation information, and the called device displays the text label.

7. The computer-implemented method of claim 1, further comprising:
   sending the query requesting CNAM information to a CNAM database and receiving CNAM information in response thereto; and
   sending the reputation message and the CNAM information to the carrier platform in response to the query requesting CNAM information.

8. A non-transitory computer readable storage medium storing executable computer program instructions for delivering reputation information, the computer program instructions comprising instructions that when executed cause a computer processor to:
   receive a query from a carrier platform requesting caller ID name (CNAM) information associated with a call from a caller number;
   responsive to receipt of the query, interfacing with the carrier platform to delay the call;
   determine reputation information responsive to the caller number, the reputation information indicating a likelihood that the call is a nuisance call;
   generate a reputation message describing the reputation information; and
   send the reputation message to the carrier platform in response to the query requesting CNAM information.

9. The computer readable medium of claim 8, wherein the computer program instructions for receiving a query from the carrier platform requesting CNAM information comprise instructions that when executed cause the computer processor to:
   intercept a query sent from the carrier platform to a CNAM database requesting CNAM information for a call placed by a calling device having the caller number;
   wherein the carrier platform sends the reputation message to a called device using a caller identification (ID) service and the called device displays the reputation message.

10. The computer readable medium of claim 8, wherein the computer program instructions for determining reputation information comprise instructions that when executed cause the computer processor to:
    send the query requesting CNAM information to a CNAM database and receiving CNAM information in response thereto, the CNAM information and the caller number comprising caller identity information; and
    query a reputation database using the caller identity information, the reputation database storing reputation information in association with caller identity information, and receiving the reputation information in response thereto.

11. The computer readable medium of claim 8, wherein the computer program instructions for determining reputation information comprise instructions that when executed cause the computer processor to:
    generate the reputation information responsive at least in part to a call activity history associated with the caller number.

12. The computer readable medium of claim 8, wherein the computer program instructions for generating a reputation message comprise instructions that when executed cause the computer processor to:
    represent the reputation information as a quantitative reputation score having a value indicating a likelihood that the call is a nuisance call;
    associate a text label with the quantitative reputation score; and
    generate the reputation message responsive to the text label.

13. The computer readable medium of claim 8, wherein the computer program instructions for generating a reputation message comprise instructions that when executed cause the computer processor to:
- determine a text label describing the reputation information;
- identify a code value corresponding to the text label in a dictionary; and
- form a reputation message containing the code value;
- wherein the carrier platform sends the reputation message to a called device using a caller identification (ID) service, the called device detects and interprets the code value contained in the reputation message to identify the text label describing the reputation information, and the called device displays the text label.

14. The computer readable medium of claim 8, wherein the computer program instructions for delivering reputation information further comprise instructions that when executed cause the computer processor to:
- send the query requesting CNAM information to a CNAM database and receiving CNAM information in response thereto; and
- send the reputation message and the CNAM information to the carrier platform in response to the query requesting CNAM information.

15. A computer system for delivering reputation information, the system comprising:
- a computer processor for executing computer program instructions; and
- a non-transitory computer readable storage medium storing computer program instructions executable by the processor to:
  - receive a query from a carrier platform requesting caller ID name (CNAM) information associated with a call from a caller number;
  - responsive to receipt of the query, interface with the carrier platform to delay the call;
  - determine reputation information responsive to the caller number, the reputation information indicating a likelihood that the call is a nuisance call;
  - generate a reputation message describing the reputation information; and
  - send the reputation message to the carrier platform in response to the query requesting CNAM information.

16. The system of claim 15, wherein receiving a query from the carrier platform requesting CNAM information comprises:
- intercepting a query sent from the carrier platform to a CNAM database requesting CNAM information for a call placed by a calling device having the caller number;
- wherein the carrier platform sends the reputation message to a called device using a caller identification (ID) service and the called device displays the reputation message.

17. The system of claim 15, wherein determining reputation information comprises:
- sending the query requesting CNAM information to a CNAM database and receiving CNAM information in response thereto, the CNAM information and the caller number comprising caller identity information; and
- querying a reputation database using the caller identity information, the reputation database storing reputation information in association with caller identity information, and receiving the reputation information in response thereto.

18. The system of claim 15, wherein generating a reputation message comprises:
- representing the reputation information as a quantitative reputation score having a value indicating a likelihood that the call is a nuisance call;
- associating a text label with the quantitative reputation score; and
- generating the reputation message responsive to the text label.

19. The system of claim 15, wherein generating a reputation message comprises:
- determining a text label describing the reputation information;
- identifying a code value corresponding to the text label in a dictionary; and
- forming a reputation message containing the code value;
- wherein the carrier platform sends the reputation message to a called device using a caller identification (ID) service, the called device detects and interprets the code value contained in the reputation message to identify the text label describing the reputation information, and the called device displays the text label.

20. The computer-implemented method of claim 1, wherein the call is placed from the caller number to a called device, interfacing with the carrier platform to delay the call comprises delaying the call from reaching the called device, and the determining, generating, and sending occur while the call is delayed.

* * * * *